United States Patent
Bracquemart et al.

(10) Patent No.: US 10,072,527 B2
(45) Date of Patent: Sep. 11, 2018

(54) THERMAL AND ACOUSTIC INSULATION ASSEMBLY AND METHOD FOR AN EXHAUST DUCT OF A ROTARY MACHINE

(71) Applicant: General Electric Company, Schenectady, NY (US)

(72) Inventors: Eric Bracquemart, Belfort (FR); Didier Baranzize, Belfort (FR)

(73) Assignee: General Electric Company, Schenectady, NY (US)

( * ) Notice: Subject to any disclaimer, the term of this patent is extended or adjusted under 35 U.S.C. 154(b) by 510 days.

(21) Appl. No.: 14/569,149

(22) Filed: Dec. 12, 2014

(65) Prior Publication Data

US 2015/0337686 A1    Nov. 26, 2015

(30) Foreign Application Priority Data

May 23, 2014   (EP) .................................... 14305776

(51) Int. Cl.
*F01D 25/30* (2006.01)
*F16L 59/12* (2006.01)

(52) U.S. Cl.
CPC .............. *F01D 25/30* (2013.01); *F16L 59/12* (2013.01); *F05D 2230/642* (2013.01); *F05D 2260/231* (2013.01); *F05D 2260/964* (2013.01); *Y10T 29/49352* (2015.01)

(58) Field of Classification Search
CPC ................ F16L 59/12; F05D 2260/964; F05D 2260/231; F01D 25/30
See application file for complete search history.

(56) References Cited

U.S. PATENT DOCUMENTS

| 2,347,756 A | * | 5/1944 | Swenson | E04B 2/962 |
| | | | | 277/650 |
| 2,544,538 A | | 3/1951 | Mahnken et al. | |
| 3,762,498 A | | 10/1973 | May et al. | |
| 4,944,151 A | * | 7/1990 | Hovnanian | F23R 3/002 |
| | | | | 60/752 |

(Continued)

FOREIGN PATENT DOCUMENTS

| DE | 19631291 A1 | * | 2/1998 | ............. F16L 59/12 |
| EP | 0 791 726 | | 8/1997 | |

(Continued)

OTHER PUBLICATIONS

KR 100576388 B1 machine translation.*
JP 2010121496 A machine translation.*
DE 19631291 A1 machine translation.*

*Primary Examiner* — Len Tran
*Assistant Examiner* — Gordon Jones
(74) *Attorney, Agent, or Firm* — Nixon & Vanderhye P.C.

(57) ABSTRACT

A thermal acoustic insulation structure including: a metal internal sheet having an exposed surface configured to be exposed to a hot gas, an external sheet and an insulation sandwiched between the internal and external sheets; a bar secured to the metal internal sheet and extending through at least a portion of the insulation; a bracket connected to the external sheet or to a support plate extending from the external sheet, wherein the bracket includes an opening configured to receive an end of the bar; a fastener securing the end of the bar to the bracket, and an insulating washer separating the bracket from the bar and the fastener.

20 Claims, 5 Drawing Sheets

(56) References Cited

U.S. PATENT DOCUMENTS

| | | | |
|---|---|---|---|
| 5,104,286 A | 4/1992 | Donlan | |
| 5,378,026 A * | 1/1995 | Ninacs | F16L 51/024 285/229 |
| 5,603,604 A | 2/1997 | Norris et al. | |
| 5,669,812 A | 9/1997 | Schockemoehl et al. | |
| 6,035,964 A | 3/2000 | Lange | |
| 6,317,915 B1 * | 11/2001 | Grearson | E04B 9/001 14/73 |
| 6,807,803 B2 | 10/2004 | Poccia et al. | |
| 7,549,507 B2 * | 6/2009 | Aida | F23J 13/02 181/224 |
| 8,613,589 B2 | 12/2013 | Yamashita et al. | |
| 8,631,620 B2 * | 1/2014 | Guinn | E04B 1/4178 52/309.11 |
| 2003/0136101 A1 | 7/2003 | Nishimura et al. | |
| 2004/0107690 A1 | 6/2004 | Poccia et al. | |
| 2009/0077978 A1 | 3/2009 | Figueroa et al. | |
| 2009/0123277 A1 | 5/2009 | Dalsania et al. | |
| 2009/0308075 A1 | 12/2009 | Mizumi et al. | |
| 2011/0088398 A1 | 4/2011 | Subbarao et al. | |
| 2013/0129498 A1 | 5/2013 | Hofmann et al. | |
| 2014/0003931 A1 | 1/2014 | Bruhwiler | |

FOREIGN PATENT DOCUMENTS

| | | | |
|---|---|---|---|
| EP | 1 359 308 | 11/2003 | |
| EP | 1655722 | 5/2006 | |
| EP | 2947283 | 11/2015 | |
| FR | 2146362 | 3/1973 | |
| FR | 2697287 | 4/1994 | |
| FR | 2924745 | 6/2009 | |
| FR | 2934009 | 1/2010 | |
| GB | 2411666 A * | 9/2005 | E04B 9/001 |
| JP | 60-219420 | 11/1985 | |
| JP | 2010-121496 | 6/2010 | |
| JP | 2010121496 A * | 6/2010 | |
| KR | 100576388 B1 * | 5/2006 | F16L 59/12 |
| WO | 2010/010277 | 1/2010 | |

\* cited by examiner

THERMAL AND ACOUSTIC INSULATION ASSEMBLY AND METHOD FOR AN EXHAUST DUCT OF A ROTARY MACHINE

RELATED APPLICATION

This application claims the benefit of the European patent application EP14305776.8 filed May 23, 2014, the entirety of which is incorporated by reference.

BACKGROUND OF THE INVENTION

The invention relates to a thermal-acoustic protection sheet assembly for an exhaust duct of a rotary machine or boiler associated with the machine.

Rotary machines, such as industrial gas turbines, and boilers discharge exhaust gases that require exhaust ducts. The exhaust gases typically leave the rotary machines at high velocities and high temperatures such as in excess of 600° C. (degrees Celsius). Exhaust ducts, such as diffusers, include passages that direct the exhaust gases from the rotary machines or boilers to heat recovery steam generators (HRSG) or other systems that receive the exhaust gases.

Exhaust ducts tend to be relatively large structures that provide a gas passage for large volumes of exhaust gases. A typical exhaust duct may have a cross-sectional dimension of 100 to 900 square feet (9 to 100 square meters). The cross-sectional area of the exhaust duct may increase as the exhaust gas flows from the rotary machine to the HRSG. The exhaust duct may have a generally square, circular or conical cross section. The exhaust duct may be connected to the discharge end of the rotary machine or boiler by an expansion joint.

The walls of an exhaust duct are typically formed by insulated sheet assemblies. These assemblies are arranged side-by-side and supported by a framework of ribs to form the wall of a passage for the exhaust gases. Each sheet assembly includes an internal stainless steel sheet, an external steel sheet and an intermediate layer (or layers) of insulation between the internal and external sheets. Insulation in the walls suppresses the transmission of heat and acoustic noise from the hot gases to the environment surrounding the exhaust duct.

The insulation in the intermediate layer is typically formed of mineral fibers, glass fibers, bio-soluble fibers or rock wool. The insulation is arranged in layers or may be packed as a cushioning material between the interior and external sheets. The materials and thicknesses of the intermediate layer(s) of the exhaust duct is typically selected to attain a certain low heat transfer coefficient through the intermediate layer. The insulation is generally configured to prevent the material from disintegrating over time and facilitate the handling of the insulation during installation of the insulation into the sheet assemblies.

The sheet assembly includes support plates also referred to as separators that extend through the intermediate layer to support the internal and external sheets and provide spacing for the intermediate layer.

The support plates are typically perpendicular to the internal and external sheets. An edge of each support plate is fixed or welded to an internal surface of the external sheet. An opposite edge of each support plate is attached to a bolt that extends through the internal sheet. A nut and washer are fastened to the bolt to secure the internal sheet to the support plate. The assembly of nuts, washers and support plates form a framework that holds together the internal sheet, the intermediate layer and the external sheet.

The bolts and support plates tend to conduct heat through the sheet assembly. Heat is conducted because the bolts and support plates form a metal path through the intermediate layer. The bolts are fasten to the hot internal sheet and may be directly exposed to the hot exhaust gases if they extend through the internal sheet. The bolts conduct heat to the support plates. If an edge of the support plate is in contact with the internal sheet, heat from the internal sheet may be conducted directly to the support plate. The metal material of the bolts and support plates conducts heat to a much greater extent than does the insulation of the intermediate layer. The metal paths of the bolts and support plates form thermal bridges through the insulation of the intermediate layer of the sheet assembly.

BRIEF DESCRIPTION OF THE INVENTION

There is a long felt need for a thermal acoustic sheet assembly for a wall of an exhaust duct that effectively suppresses the transmission of heat and acoustic noise and lacks thermal bridges that conduct heat through the sheet assembly. A thermal acoustic insulating sheet assembly has been conceived and is disclosed here for a hot gas exhaust duct of a rotary machine, a boiler or other source of a large volume of hot gases. The conceived thermal acoustic insulating sheet assembly avoids the heat conductive paths formed by bolts and support plates of a conventional sheet assembly.

The thermal acoustic insulating sheet assembly may comprise an internal sheet, an external sheet parallel to the internal sheet and a thermally insulating layer or layers between the sheets. The internal sheet may be formed of stainless steel or other metal, the external sheet may be steel or another metal and the insulation in the intermediate layer includes insulation formed of layers or cushioning material formed of, for example, of mineral fibers, glass fibers, bio-soluble fibers or rock wool.

The thermal acoustic insulating sheet assembly also includes bars and thermally insulating support brackets for connecting the bars to the external sheet. The bars and support brackets replace the bolts and support plates of a conventional insulting sheet assembly. The support brackets may include insulated washers and non-conductive layers that thermally isolate the bar from the support bracket.

A thermal acoustic insulation structure has been conceived and is disclosed here that includes including: a metal internal sheet having an exposed surface configured to be exposed to a hot gas, an external sheet and an insulation sandwiched between the internal and external sheets; a bar secured to the metal internal sheet and extending through at least a portion of the insulation; a bracket connected to the external sheet, wherein the bracket includes an opening configured to receive an end of the bar; a fastener securing the end of the bar to the bracket, and an insulating washer separating the bracket from the bar and the fastener.

An exhaust gas duct has been conceived and is disclosed here that includes: a gas passage, and a wall of the gas passage, wherein the wall forms a closed perimeter of a cross section of the gas passage, and the wall includes: a metal internal sheet having an exposed surface configured to be exposed to a hot gas, an external sheet and an insulation layer sandwiched between the internal and external sheets; a bar secured to the metal internal sheet and extending through at least a portion of the insulation; a bracket fixed to the external sheet, wherein the bracket includes an opening configured to receive an end of the bar; a fastener securing the end of the bar to the bracket, and an insulating washer separating the bracket from the bar and the fastener.

A method to assembly a thermal acoustic wall structure has been conceived and is disclosed here that includes: sandwiching an insulation layer between a metal internal sheet having an exposed surface configured to be exposed to a hot gas and an external sheet and an insulation sandwiched between the internal and external sheets; fastening a bar to the metal internal sheet and extending the bar through at least a portion of the insulation; fastening the bar to a bracket fixed to the external sheet, wherein the bracket includes an opening configured to receive an end of the bar; securing the end of the bar to the bracket, and installing an insulating washer to separate the bracket from the bar and the fastener.

DETAILED DESCRIPTION OF THE INVENTION

Figure 1:
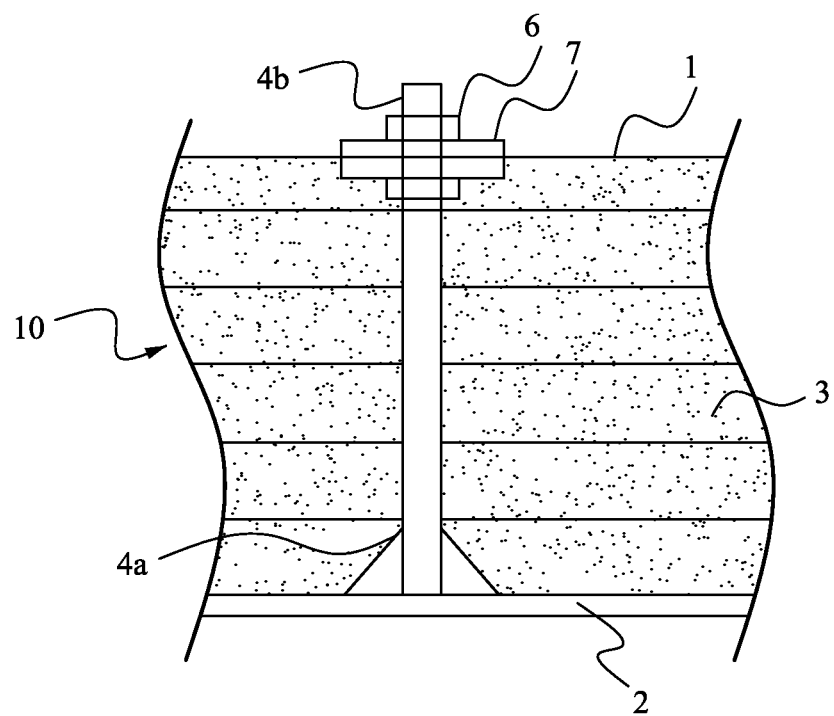
FIG. 1 is a side view of a cross section of a conventional acoustic thermal sheet assembly.

FIG. 1 illustrates a conventional thermal acoustic sheet assembly 10 for an exhaust duct of a rotary machine. The insulation structure 10 comprises an internal sheet 1 and an external sheet 2. An insulation layer 3 is between the internal 1 and external sheet 2. A bar 4 extends through the insulation layer. A first end 4a of each bar is welded to an internal surface (insulation side) of the external sheet 2 such that the bar is perpendicular to the external sheet. The opposite end 4b of the bar extends through a hole in the internal sheet 1. The opposite end 4b is threaded and receives a nut 6 that with a washer 7 secures the internal sheet to the bar. Several bars, nuts and washers are arranged in the insulation structure and hold together the assembly of the internal sheet, insulation layer and external sheet.

Figure 2:
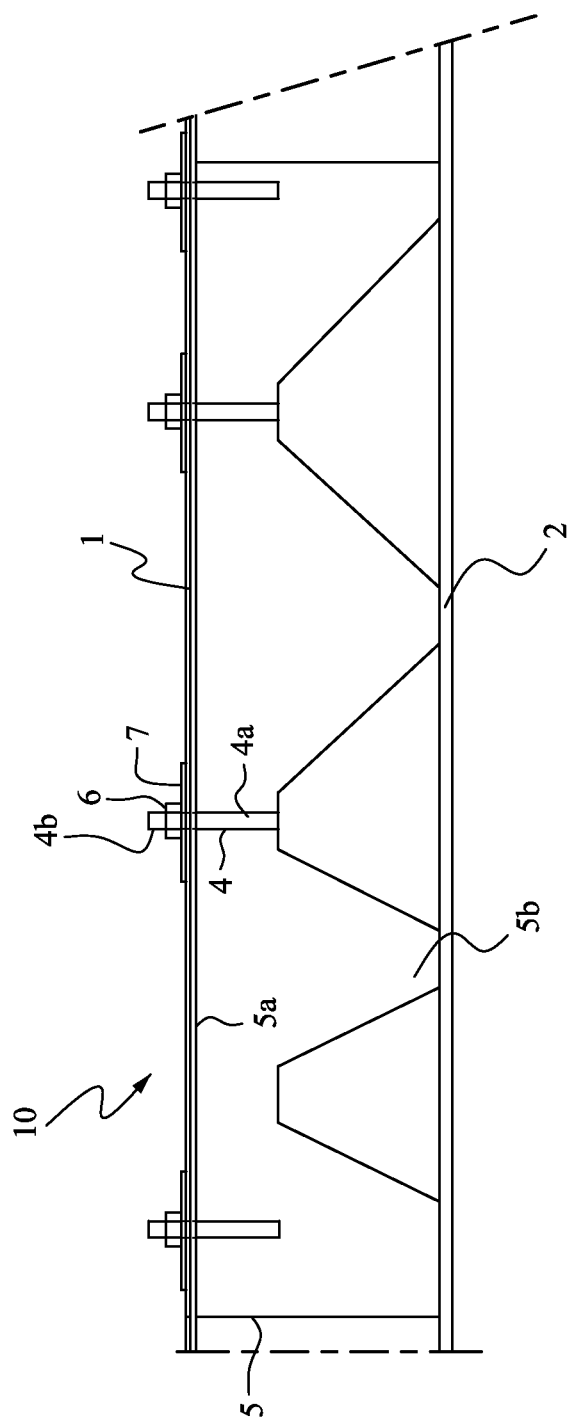
FIG. 2 is a side view of the conventional acoustic thermal sheet assembly.

FIG. 2 illustrates the conventional thermal acoustic sheet assembly 10 with an internal sheet 1 and an external sheet 2. An insulation layer 3 is between the sheets 1, 2. Bars 4 extend partially through the insulation layer and are fitted to a support plate 5 between the sheets. The support plate 5 may be a flat plate extending through the insulation layer and oriental perpendicularly to the internal and external sheets. The support plate 5 is parallel to other support plates in the sheet assembly. The support plates are at regular intervals across the width of the insulation structure. The support plate has a straight edge 5a adjacent the internal sheet. The opposite edge of the support plate includes V-shaped cuts and feet 5b between the cuts. The feet 5b are welded to an internal surface (insulation side) of the external sheet 2.

One end 4a of each bar 4 is welded to one of the plates 5 above the V-shaped cuts in the plate. The opposite end 4b of each bar is aligned with and extends through a hole in the internal sheet 1. Nuts 6 engage threads on the end 4b. Annular washers 7 are fitted on the end 4b on opposite sides of the internal sheet. The washers and nut secure the bar and the plate to the internal sheet. The nuts and washers engage the threaded end 4b of the each bar such that the internal sheet compresses the insulation layer 3.

The side of the internal sheet 1 opposite to the insulation layer is exposed to hot gases discharged from the rotary machine. Because the threaded ends 4b of the bars 4 extend through the internal sheet, the ends of the bars are exposed to the hot gases. Heat from the hot gases conducts through the internal sheet, the bars and into the metal support plates 5. The conducted heat through the bars and support plates allows heat to flow past the insulation layer 3 and conduct heat into the external sheet. The conduction of heat through the support plate forms a thermal bridge through the insulation layer that reduces the effectiveness of the insulation layer in suppressing the transfer of heat from the hot exhaust gas to the external sheet and to the ambient air environment beyond the insulation structure 10.

Figure 3:
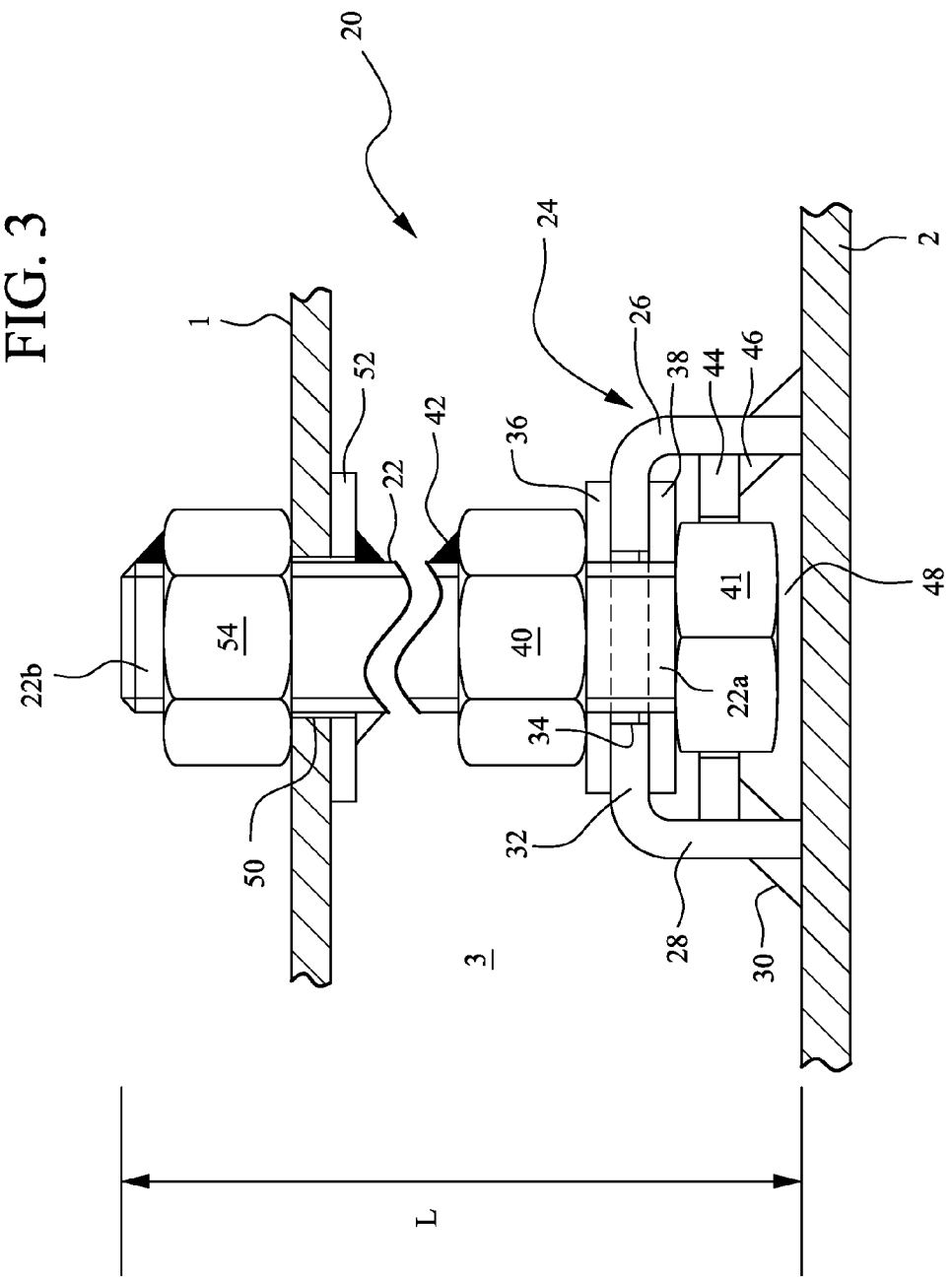
FIG. 3 is a side view of a bar fitted on a novel support element in an acoustic thermal sheet assembly.

FIG. 3 illustrates a first embodiment a thermal-acoustic sheet assembly 20 for ducting exhaust gas from a rotary machine to a HRSG or other system. The elements of the structure 20 that are similar to elements of the conventional insulation structure bear the same reference numbers.

The thermal-acoustic sheet assembly 20 includes one or more internal sheets 1 each having a surface exposed to the hot gases discharged from the rotary machine and one or more external sheets 2 each having a side exposed to ambient air. An insulating layer(s) 3, such as an insulating mattress, is sandwiched between the internal and external sheets 1 and 2. The internal and external sheets may be substantially parallel to each other, such as within five degrees of parallel. The materials and structure of the insulation layer 3 may be conventional and are not show so that the details of the connecting bars may be illustrated.

Bars 22 may be arranged in a regular pattern and at regular distances in the thermal acoustic sheet assembly 20. The bars 22 provide structural support for the thermal acoustic structure, such as providing the separation between the internal and external sheets and a compression of the insulation layer. The bars may be metal rods and formed steel or stainless steel for example. The bars may be threaded along their entire length or threaded just at their ends. FIG. 3 shows the end sections 22a and 22b of the bar but does not show the middle section of the bar as the middle section is not necessary for the description of the invention. The entire length (L) of the bar extends from one end 22a to the other end 22b of the rod.

The bars may extend the thickness of the thermal acoustic structure 20 and extend entirely through the insulation layer 3. The bars 22 may be oriented substantially perpendicular to the internal and external sheets, such as within ten degrees of perpendicular.

The bars 22 are separated from the external sheet 2 by an insulated support element 24. The insulated support element supports the end 22a of the bar 22. The insulated support element 24 is fixed to the external sheet. The insulated support element 24 provides the junction between the bar 22 and the external sheet 2.

The bar 22 is not in direct contact with the external sheet 2. The lack of direct contact and the insulation in the insulated support element 24 prevents thermal conduction heat transfer from the bar 22 to the external sheet 2. Because there is only minimal thermal conduction at the junction between the junction between the bar and support element, the amount of heat transferred from the bars to the external sheet is substantially reduced, such as by 70 to 90 percent or more, as compared to the heat transfer if the bar was directly connected to the external sheet or a support plate.

An insulated support element 24 is at the end 22a of each bar 22. The insulated support element may include a U-shaped bracket 26 that extends the length of the thermal acoustic structure 20 along a direction parallel to the exhaust gas flow. The U-shaped bracket 26 may also be configured as a platform for a single bar 22. The U-shape of the bracket 26 refers to a cross sectional shape of the bracket which appears as an upside down U. The cross section shape may have other shapes, such as an O, L or C shape.

The U-shaped bracket 26 is fixed to the insulation side of the external sheet 2. The U-shaped bracket 26 has legs 28 that are welded to the external sheet 2, such as by a fillet weld 30. The legs may or may not directly contact the surface of the external sheet. A slight separation between the legs and the external sheet assists in suppressing heat transfer. The fillet weld 30 may create the separation between the legs and external sheet.

A bridge portion 32 of the U-shaped bracket 26 is spaced by the length of the legs 28 from the external sheet 2. The bridge portion 32 may be welded to the legs 28 to form the U-shaped bracket 26. The bracket may also be formed by bending a band of metal to form the legs with the bridge on either side of the legs. The bracket may also be formed from a metal piece having a U-shape cross section. The legs 28 may form a ninety degree angle with respect to the bridge. The angle between the legs and bridge may be greater or smaller than 90 degrees such that the legs splay outward of the bridge or are canted inward of the bridge. The angle between the leg and bridge may be between 45 to 135 degrees.

The bridge portion includes a circular opening 34 sized to receive an insulated washer 36. The washer 36 is annular and has a center aperture to receive the bar 22. The washer is an annular disc positioned on one side of the bridge 32 and may include a rim covering the perimeter of the opening 34. A second washer 38 covers an opposite side of the bridge. Both washers 36, 38 are centered on the opening 34 in the bridge. Alternatively, the washers 36, 38 is on an opposite side of the bridge. The washers 36, 38 separate the metal nut or nuts 40, 41 on the end 22a of the bar from the metal of the bridge 32.

The washers 36, 38 provide a thermal barrier to prevent heat conduction between the nuts and the bridge. An inner insulating cylindrical rim of the washer 36 prevents heat conduction between the bar 22 and the bridge. The washers 36, 38 are formed of a material having a low heat transfer coefficient material such as non-metal material. The washers may be formed of a ceramic, fiber glass reinforced composite or Polytetrafluoroethylene (PTFE). The washers may also be formed of a metal coated with an insulation layer. The washers provide a thermal barrier between the metal of the bar 22 and nuts 40 and the metal of the bracket 26. The washers 36, 38 may also be embodied as a brushing that seats in the opening 34.

The nuts 40, 41 such as hex nuts, engage the threads of the end 22a of the bar 22. The nuts fasten the bar 22 to the U-shaped bracket. The nuts 40, 41 are on opposite sides of the bridge portion 32 of the U-shaped bracket such that the bridge is clamped between the nuts. The torque applied to the nuts is sufficient to secure the nuts and bars to the U-shaped bracket without damaging the insulation of the washer 36. The washer may be held under compression by the nuts. The upper nut 40 may be welded 42 to the bar 22 after a desired amount of torque is applied to the nut. The lower nut 41 may be secured against rotation on the bar by an annular plate or stub 44 that receives the nut and is welded 46 to one or both of the legs 28. The weld 42 to the upper nut may be applied after the lower nut is secured against rotation.

Exemplary dimensions of the insulated support element 24 include a diameter of the washers 36, 38 being 20 millimeters (20 mm) and in a range of 15 mm to 25 mm. A gap 48 between the lower end of the bar 22a or lower surface of the nut 40 is in a range of 3 mm to 15 mm. The gap 48 provides insulation due to the air gap between the lower surface of the nut or bar and the external sheet. The gap may also allow for expansion and contraction of the length of the bar 22 and prevent the bar from expanding into contact with the external sheet.

The opposite end 22b of the bar is secured to the internal sheet 1. The end 22b extends through an opening 50 in the internal sheet 1. The opening 50 may have a diameter of 5 to 50 mm, and have sufficient clearance from the bar to permit variations in the thermal expansion and contraction of the sheet and bar. A washer 52 is welded to the bar and forms a flange that engages an insulation side surface of the internal sheet. The threads of the end 22b engage a nut 54 that secures the bolt 22 to the gas exposed surface of the internal sheet.

There is no support plate shown in the embodiment shown in FIG. 3. A support plate may be included in another embodiment of the thermal acoustic sheet assembly. The support plate 84, in FIG. 5, may be connected along one edge to the internal sheet and along an opposite edge to bars. The bars would connect the U-shaped bracket fixed to the external sheet.

Figure 4:
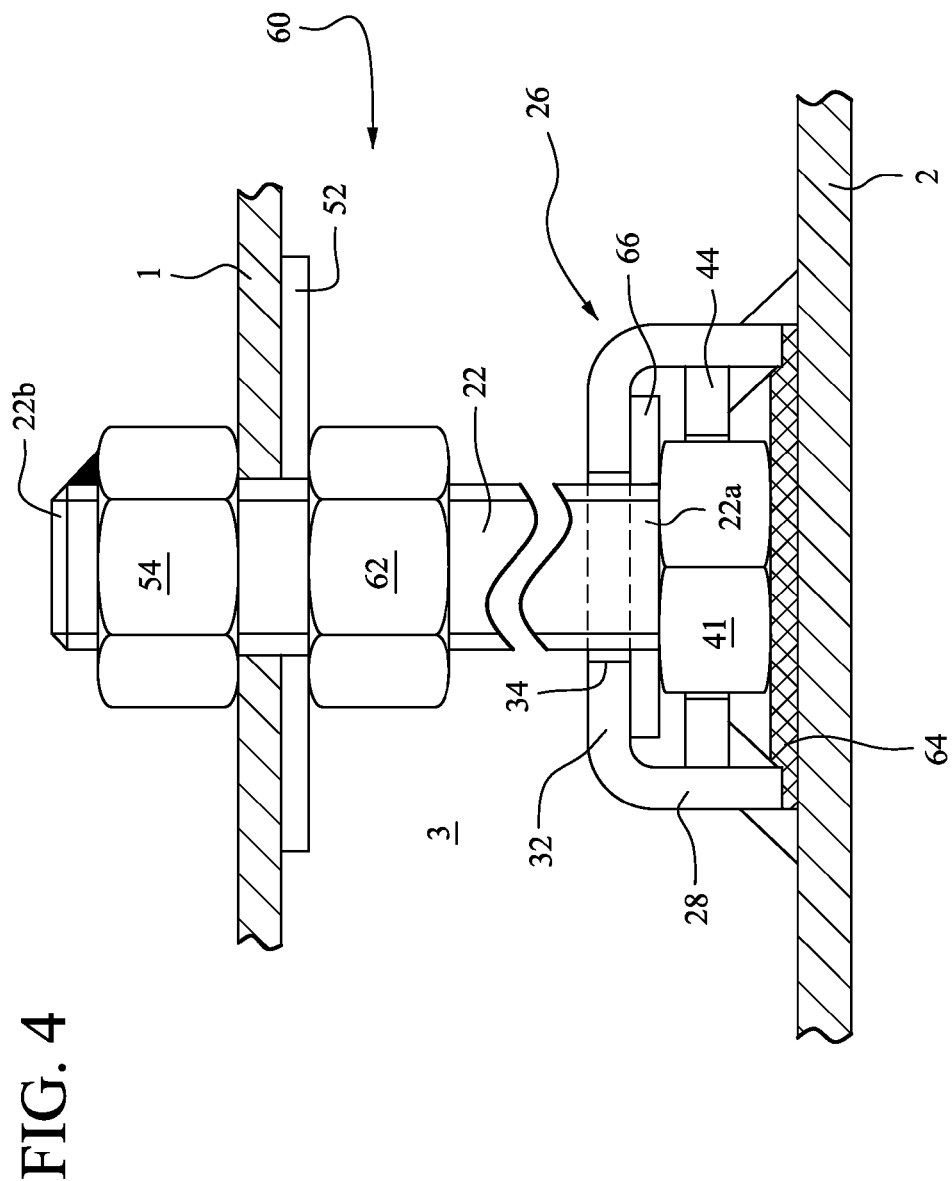
FIG. 4 is a side view of a second embodiment of a bar fitted on a novel support element arranged in a thermal acoustic sheet assembly.

FIG. 4 is a side view of an alternative embodiment of a thermal acoustic sheet assembly 60 that includes an internal sheet(s) 1, an external sheet(s) 2 and an insulation layer 3. The same reference numbers have been used to identify the components of the thermal acoustic structure 60 that are similar to the components of the other thermal acoustic structure 20.

The thermal acoustic structure 60 includes a second nut 62 that engages the end 22b of the bar 22 and the internal sheet 1. The second nut 62 is used in place of the washer welded to the bar shown in FIG. 3. A washer 52 may be between either or both of the nuts 54, 62 and the internal sheet. The two nuts 54, 62 secure the bar 22 to the internal sheet such that the sheet may not slide with respect to the bar. The two nuts also provide a means to adjust the distance between the internal and external sheets. This adjustment also is used to set a compression on the insulation layer.

The U-shaped bracket 26 is seated on an insulation layer 64 on the external sheet 2. The insulation layer may be formed of a material have a low heat transfer coefficient such as a ceramic, fiber glass reinforced composite or Polytetrafluoroethylene (PTFE). The insulation layer 64 may also be positioned in the gap between the end of the nut 41 and the external sheet 2. The insulation layer may be relatively thin, e.g., 2 mm to 4 mm between the legs 28 and the external sheet, and be relatively thick, e.g., 3 mm to 5 mm, between the nut 41 and the external sheet.

A signal nut 41 may secure the end 22a of the bar to the U-shaped bracket 26. The single nut is below the bridge 32 and is held in place by the bridge, threaded end 22a and insulation layer 64. The nut 41 is prevented from rotation by the plate or stub 44 welded to the U-shaped bracket. A washer 66 separates the nut 41 from the U-shaped bracket to prevent conduction of heat between the nut and the bracket. The washer has a low heat transfer coefficient and may be formed of materials such as a ceramic, fiber glass reinforced composite or Polytetrafluoroethylene (PTFE). The washer 66 may also include an annular rim that covers the inner perimeter of the opening 34 in the bridge and separates the bridge from the bar.

Figure 5:
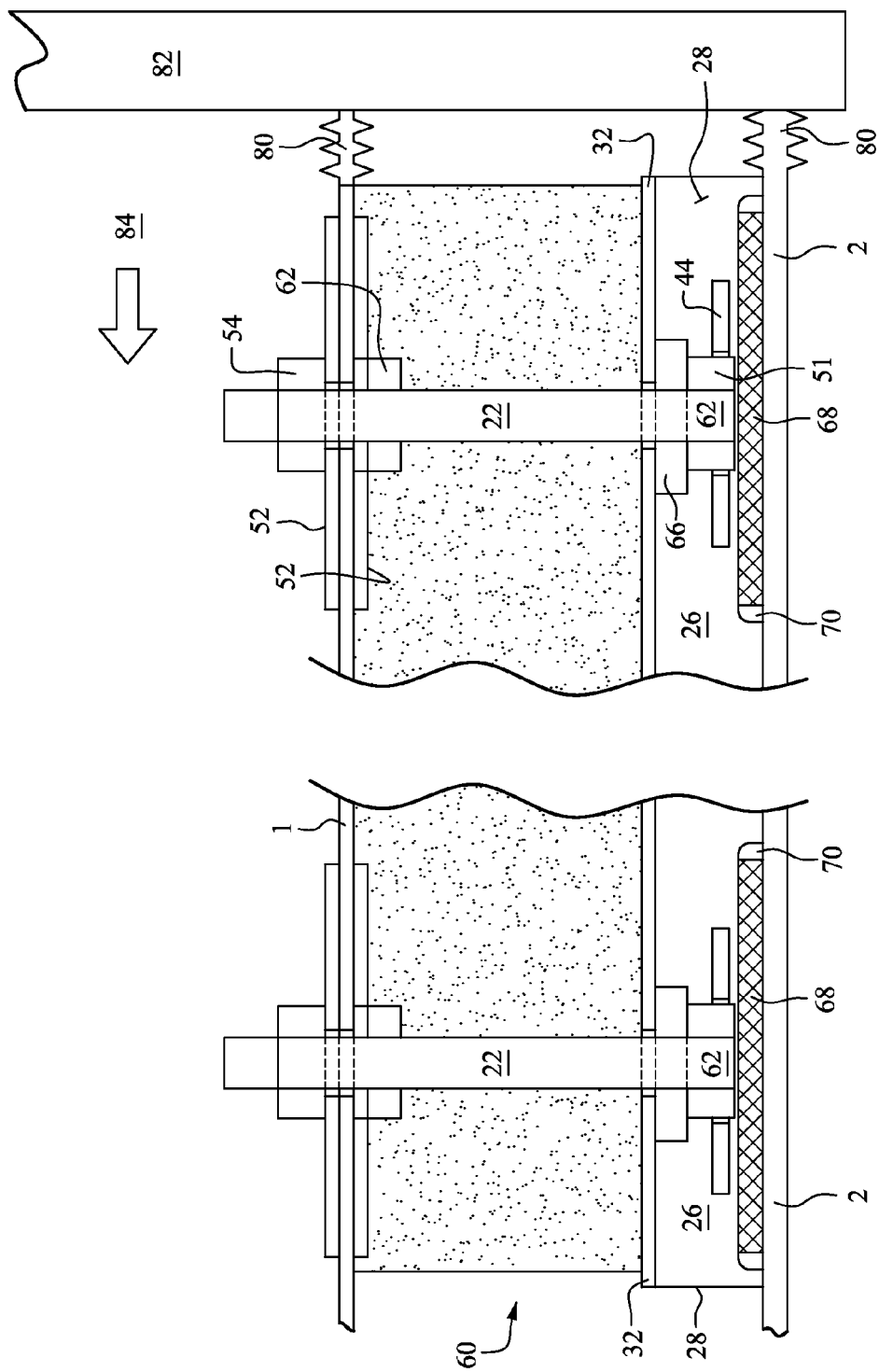
FIG. 5 is a side view of bars fitted to the support element in a thermal acoustic sheet assembly, wherein the view is along a line parallel to the support element.

FIG. 5 is a side view of the thermal acoustic structure 60 show from a view parallel to the length of the U-shaped bracket 26. In this embodiment, the U-shaped bracket 26 extends the length of the thermal acoustic structure 60. The bars 22 are arranged at regular intervals along the length of the U-shaped bracket 26. The brackets 26 may be arranged parallel to each other across the width of the structure 60 and in a direction parallel to the exhaust gas flow.

The insulation layer 3 is sandwiched between the internal and external sheets 1 and 2. The insulation layer covers the external sheet 2 except where the U-shaped bracket covers the sheet. The insulation layer fits around the U-shaped bracket but need not be within the bracket.

Unlike the embodiment shown in FIG. 4, the embodiment shown in FIG. 5 does not have an insulation layer that extends the length of the U-shaped bracket and fits between the legs of the bracket and external sheet. In the embodiment shown in FIG. 5, an insulation pad 68 is between the nut 62 and the external sheet 2. The insulation pad may be inserted through a slot 70 in one or both of the legs 28 of the U-shaped bracket. The slot is adjacent the end 22b of the bar. The insulation pad has a low heat transfer coefficient and may be formed of mineral fibers, glass fibers, bio-soluble fibers, PTFE or rock wool.

The thermal acoustic structure 60 may be connected at one end to an expansion joint 80 which is connected to a gas discharge 82 of a rotary machine such as a stationary gas turbine. The thermal acoustic structure may be assembled with other similar structures to form an exhaust duct defining a gas passage 84 through which flows the exhaust gas from the rotary machine. The gas passage may have a cross section that is circular, oval, rectangular or other entirely curved, curvilinear or straight sided shape.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A thermal acoustic insulation structure comprising:
a hot gas passage open at opposite ends of the structure, wherein the hot gas passage is configured for a hot gas flow;
a metal internal sheet having an exposed surface facing and adjacent the hot gas passage and configured to be exposed to the hot gas flow, an external sheet and an insulation sandwiched between the internal and external sheets;
a bar secured to the metal internal sheet and extending through at least a portion of the insulation;
a bracket connected to the external sheet, wherein the bracket includes an opening configured to receive a first end of the bar, wherein the bracket offsets the first end of the bar from the external sheet;
a first fastener securing the first end of the bar to the bracket;
an insulating washer separating the bracket from the bar;
the insulating washer separating the bracket from the first fastener, and
a second fastener securing a second end of the bar to the metal internal sheet.

2. The thermal acoustic insulation structure of claim 1, wherein the bracket has an inverted U-shape in cross section.

3. The thermal acoustic insulation structure of claim 1, further comprising an insulation layer separating legs of the bracket from the external sheet.

4. The thermal acoustic insulation structure of claim 1, wherein the insulating washer is formed of at least one of a ceramic, fiber glass reinforced composite and Polytetrafluoroethylene (PTFE).

5. The thermal acoustic insulation structure of claim 1, wherein the bracket extends the length of the thermal acoustic insulation structure.

6. The thermal acoustic insulation structure of claim 1, wherein the bracket includes additional openings each configured to receive another bar of the structure.

7. The thermal acoustic insulation structure of claim 1, wherein the first fastener is a nut on a threaded end of the bar and the nut is between a bridge of the bracket and the external sheet.

8. An exhaust gas duct comprising:
a gas passage, and
a wall of the gas passage, wherein the wall forms a closed perimeter of a cross section of the gas passage, and the wall includes:
a metal internal sheet having an exposed surface facing and exposed to the gas passage and configured to be exposed to a hot gas flowing through the gas passage, an external sheet and an insulation layer sandwiched between the internal and external sheets;
a bar secured to the metal internal sheet, extending through at least a portion of the insulation and secured to the external sheet, wherein the bar is configured to hold together the metal internal sheet, insulation and external sheet;
a bracket fixed to the external sheet, wherein the bracket includes an opening configured to receive a first end of the bar, wherein the bracket separates first end of the bar and the internal sheet;
a first fastener securing the first end of the bar to the bracket;
an insulating washer separating the bracket from the bar;
the insulating washing separating the bracket from the first fastener, and
a second fastener securing a second end of the bar to the external sheet.

9. The exhaust gas duct of claim 8, wherein the bracket has an inverted U-shape in cross section.

10. The exhaust gas duct of claim 8, wherein the insulating washer is formed of at least one of a ceramic, a ceramic, fiber glass reinforced composite and Polytetrafluoroethylene (PTFE).

11. The exhaust gas duct of claim 8, wherein the bracket extends the length of the thermal acoustic insulation structure.

12. The exhaust gas duct of claim 8, wherein the bracket includes additional openings each configured to receive another bar of the thermal acoustic insulation structure.

13. The exhaust gas duct of claim 8, wherein the first fastener is a nut on a threaded end of the bar and the nut is between a bridge of the bracket and the external sheet.

14. A method to assemble a thermal acoustic wall structure comprising:
sandwiching an insulation layer between a metal internal sheet having an exposed surface configured to be exposed to a hot gas and an external sheet, wherein the exposed surface is adjacent and faces a hot gas passage extending through the thermal acoustic wall structure;

fastening a second end of a bar to the metal internal sheet and extending the bar through at least a portion of the insulation;

inserting a first end of the bar into a bracket fixed to the external sheet, wherein the bracket includes an opening configured to receive the first end of the bar;

fastening the first end of the bar to the bracket, wherein the bracket offsets the first end of the bar from the external sheet, and installing an insulating washer to separate the bracket from the bar and to separate the bracket from the fastener, wherein the bar holds together the metal internal sheet, insulation and external sheet.

15. The method of claim 14, further comprising arranging the thermal acoustic wall structure in an annular array to form a gas passage in an exhaust duct for a rotary machine.

16. The method of claim 14, further comprising adjusting the fastening of the bar to the internal sheet or to the bracket, wherein the adjustment determines a distance between the internal sheet and the external sheet.

17. The method of claim 14, further comprising adjusting the fastening of the bar to the internal sheet or to the bracket, wherein the adjustment determines a compression of the insulation layer.

18. The thermal acoustic insulation structure of claim 1, wherein the insulating washer comprises a plurality of insulating washers, wherein a first insulating washer separates the bracket from the bar and a second insulating washer separates the bracket from the fastener.

19. The exhaust gas duct of claim 8, wherein the insulating washer comprises a plurality of insulating washers, wherein a first insulating washer separates the bracket from the bar and a second insulating washer separates the bracket from the fastener.

20. The thermal acoustic insulation structure of claim 1, wherein the end of the bar is located between the bracket and the external sheet.

* * * * *